United States Patent [19]

Ustelentsev et al.

[11] Patent Number: 4,969,624
[45] Date of Patent: Nov. 13, 1990

[54] SUSPENSION OF A VEHICLE SEAT

[75] Inventors: Lev I. Ustelentsev; Galina N. Pogorelova, both of Chelyabinsk, U.S.S.R.

[73] Assignee: Vsesojuzny Nauchno-Issledovatelsky Institut Okhrany Truda I Tekhniki Bezopasnosti Chernoi Metallurgii (Vniitbchermet), Chelyabinsk, U.S.S.R.

[21] Appl. No.: 430,114

[22] Filed: Nov. 1, 1989

[51] Int. Cl.[5] .......................................... F16M 13/00
[52] U.S. Cl. .................... 248/550; 248/599; 248/562; 248/638; 267/136; 267/140.1; 188/267
[58] Field of Search ............... 248/599, 562, 636, 550, 248/638; 267/136, 140.1; 188/267

[56] References Cited

U.S. PATENT DOCUMENTS 4,624,435 11/1986 Freudenberg ..................... 248/550

FOREIGN PATENT DOCUMENTS 662384 5/1979 U.S.S.R. .
1357625 12/1987 U.S.S.R. .

Primary Examiner—Alvin C. Chin-Shue
Attorney, Agent, or Firm—Fleit, Jacobson, Cohn, Price, Holman and Stern

[57] ABSTRACT

A suspension of a vehicle seat comprises a bearing plate to which the vehicle seat is secured, a first base mounted on the floor of the vehicle cabin, and mechanical resilient elements provided between the first base and bearing plate. Arranged vertically in line with the axis of symmetry of the first base is an electrodynamic exciter including a second base, a magnetic circuit in the form of outer and inner cylindrical elements, two groups of coils secured at the inside surface of the outer element of the magnetic circuit and at the outside surface of the inner element of the magnetic circuit. The electrodynamic exciter further comprises a guide mechanism in the form of a cup with a cover plate. Attached to the cover plate of the cup of the guide mechanism is a magnetic unit. The electrodynamic exciter also comprises a first stop mechanism positioned between the outer element of the magnetic circuit and cup of the guide mechanism, and a second stop mechanism mounted on a rod received in a central hole of the cover plate of the guide mechanism.

2 Claims, 3 Drawing Sheets

SUSPENSION OF A VEHICLE SEAT

FIELD OF THE INVENTION

This invention relates generally to mechanical engineering, and more particularly to suspensions of a vehicle seat.

The invention can find application in locomotives, aircrafts, helicopters, sea-going vessels, and trucks for protecting the driver operating the vehicle against the harmful effect of low-frequency vibration, as well as for damping mechanical vibrations to which electrical measuring and electronic instruments, precision mechanisms and other devices are exposed, such as in machine tool manufacture, vehicle engineering, and instrument making.

BACKGROUND OF THE INVENTION

There is known a suspension of a vehicle seat (cf., SU, A, No. 662,384) in which protection against vibration is ensured by adjusting the dynamic rigidity of resilient elements of the shock absorber. The resilient elements are made of lengths of a multicore cable having ends thereof secured between a support base and a movable shell secured on a post to be capable and a movable shell secured on a post to be capable of rotation about its own axis. The resilient elements are characterized by dynamic rigidity of a magnitude equal to the magnitude of the static rigidity. Variations in the angle of turn of the shell relative to the base lead to a change in the inclination angle of the cable lengths and dynamic rigidity of the resilient elements of the shock absorber.

Reduced dynamic rigidity of the resilient elements results in a reduction in the natural frequency of oscillations of the support of the vehicle seat. Due to the equality in the magnitudes of the dynamic and static rigidity of the resilient elements, adjustment of the dynamic rigidity influencing the efficiency of protection of the driver against vibrations of the vehicle gives rise to variations in the static rigidity of the resilient elements determining the static sagging of the support of the vehicle seat. Therewith, reduced dynamic rigidity of the resilient elements ensuring a more efficient protection against vibrations causes a reduction in the static rigidity of the resilient elements and consequently a more pronounced static sagging of the vehicle seat due to the weight of the operator.

Therefore, there is a conflict between the preferred reduction in the natural frequency of oscillations of the shock absorber for attaining a more reliable protection against vibrations and the magnitude of the allowable static sagging. Protection of the operator against vibrations of the vehicle he drives is thus limited by the allowable static sagging of the support element of the vehicle seat.

There is also known a suspension of a vehicle seat (cf., SU, A, No. 1,357,625) having the form of an adjustable vibrations insulator or absorber comprising a bearing plate to which the vehicle seat is secured, a first base mounted on the floor or the vehicle, mechanical resilient elements secured about the outer perimeter of the first base between the first base and bearing plate. Arranged in parallel with the mechanical resilient elements at the first base to extend vertically in line with its axis of symmetry is an electrodynamic exciter made up of a fixed system in the form of a magnetic circuit having an annular clearance and secured at the first base, and a movable system in the form of coils arranged in the annular clearance of the magnetic circuit. The static rigidity of the suspension is determined by the rigidity of the resilient elements, whereas the dynamic rigidity is determined by the rigidity of the resilient elements and rigidity imparted by the electrodynamic exciter, which can be either positive or negative depending on the flow of the direct current passing through the coils. The natural frequency of oscillations of the vehicle seat suspension can be increased if the rigidity imparted by the electrodynamic exciter is positive, or reduced if the imparted rigidity is negative. However, such an adjustment of the dynamic rigidity irrespective of the static rigidity is possible only when in the initial position prior to energizing the coils assume a definite position relative to the clearance in the magnetic circuit of the electrodynamic exciter, viz., the coils must be arranged in symmetry relative to a horizontal plane extending through the midpoint of the clearance of the magnetic circuit. In this case, during oscillations the upper and lower coils are caused to be alternately forced to the clearance of the magnetic circuit to a magnitude equalling the amplitude of oscillations whereby a pushing force is produced which is proportional to the relative displacement between the first base and bearing plate, i.e., a pushing force equivalent to the dynamic rigidity of the suspension. In the absence of oscillations the coils are brought out of the clearance of the magnetic circuit whereby they fail to provide a continuous pushing force which would be equivalent to the static rigidity. However, this manner of adjusting the rigidity of the vehicle seat suspension is possible only when under the action of the weight of the operator the static sagging of the suspension determined by the static rigidity of the resilient elements is such that the coils assume the heretofore described initial position. As the rigidity of the resilient elements is a constant, the required static sagging according to the known expression $\delta = P/k$, where $\delta$ is the static sagging, $P = mg$ is the gravity force, m is the mass of the driver, and k is the static rigidity of the vibrations insulator, is preset only for an operator of a certain weight. If the weight of the operator is other than that for which the seat is adjusted, the static sagging of the suspension is also different from the specified, and the coils fail to assume the required initial position. Therewith, one of the coils in the initial position accommodates in the clearance of the magnetic circuit, and as it is energized by a direct current source it produces a pushing force in the absence of vibrations in the vehicle. Depending on the flow of electric current, this pushing force acts to additionally compress or expand the resilient elements thereby changing the static sagging of the suspension, i.e., the effect of this pushing force is equivalent to the static rigidity of the resilient elements.

In view of the aforedescribed, the dynamic rigidity of the suspension can be adjusted without changing the static rigidity of the resilient elements only for an operator of definite weight. The weight of the drivers can vary within a wide range, and therefore the capability of adjusting the dynamic rigidity of the vehicle seat suspension is inherently limited to result in less efficient protection of the driver against vibrations of the vehicle.

SUMMARY OF THE INVENTION

It is an object of the invention to provide a more effective protection of the driver against vibrations of the vehicle he drives.

The object of the invention is attained by that in a suspension of a vehicle seat comprising a bearing plate to which the vehicle seat is secured, a first base mounted on the floor of the vehicle cabin, mechanical resilient elements secured about the outer perimeter of the first base between this base and bearing plate, an electrodynamic exciter arranged vertically in line with the axis of symmetry of the first base in parallel with the mechanical resilient elements mechanically connected to the bearing plate, according to the invention, the electrodynamic exciter comprises a second base fabricated from a nonmagnetic material and secured at the first base, a magnetic circuit in the form of outer and inner cylindrical elements arranged concentrically relative to each other and secured accordingly about the outer and inner diameters of the second base, two groups of coils electrically connected in series opposition, coils of one of the groups being secured at the outside surface of the outer cylindrical element of the magnetic circuit, whereas coils of the second group are secured at the outside surface of the inner cylindrical element of the magnetic circuit, a guide mechanism in the form of a cup mounted at the outside surface of the outer cylindrical element of the magnetic circuit by means of bearings to be capable of movement in the vertical direction, an end face thereof carrying a cover plate having a central hole which receives one end of a rod for free movement therein, the other end of this rod being fixedly secured on the bearing plate, a magnetic unit made up of alternating annular pole pieces and permanent magnets secured at the cover plate of the cup of the guide mechanism, and positioned between the outer and inner cylindrical elements of the magnetic circuit with a clearance between the outside surface of the magnetic unit and inside surface of the outer cylindrical element of the magnetic circuit, and between the inside surface of the magnetic unit and outside surface of the inner cylindrical element of the magnetic circuit, and further comprises a first stop mechanism positioned between the outer cylindrical element of the magnetic circuit and cup of the guide mechanism, the rod received in the central hole of the cover plate of the guide mechanism accommodating a second stop mechanism secured at the cover plate of the guide mechanism.

In order to ensure a still more effective protection of the vehicle driver against vibrations of the vehicle, it is advisable that at least one T-shaped hole be provided in the cylindrical wall of the cup of the guide mechanism, the stop mechanism preferably having the form of at least one rod received in the T-shaped holes of the cup of the guide mechanism and rigidly affixed to an annular plate capable of rotation in an annular groove made at the outside surface of the outer cylindrical element of the magnetic circuit.

The proposed arrangement of a suspension of a vehicle seat makes it possible to adjust the dynamic rigidity of the resilient elements regardless of the static rigidity of the resilient elements. In the suspension of a vehicle seat the static rigidity is determined by the rigidity of the resilient elements, whereas the dynamic rigidity is determined by the rigidity of the resilient elements and rigidity imparted by the electrodynamic exciter. Adjustment of the dynamic rigidity is effected regardless of the magnitude of static rihidity and is not limited by the allowable static sagging of the vehicle seat, which permits a more effective protection of the driver against vibrations of the vehicle.

BRIEF DESCRIPTION OF THE DRAWINGS

The invention will now be described in greater detail with reference to a specific preferred embodiment thereof taken in conjunction with the accompanying drawings, in which.

BEST MODE OF CARRYING OUT THE INVENTION

Figure 1:
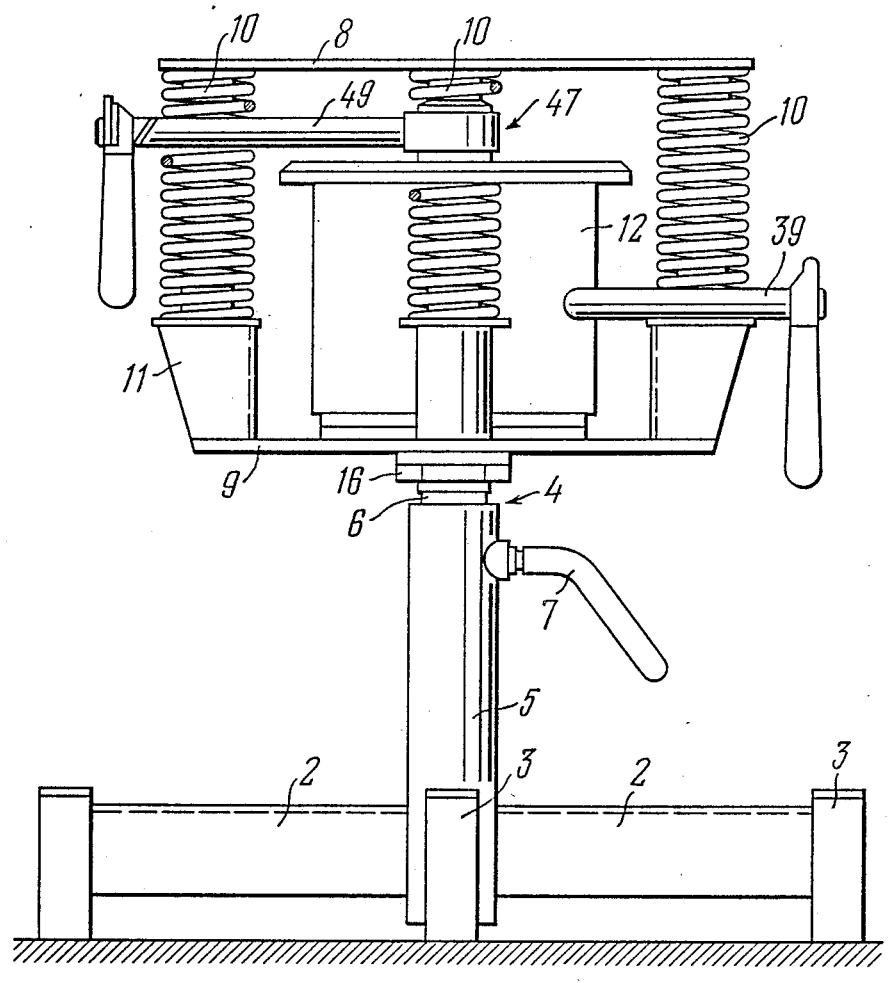
FIG. 1 is a front view of a suspension of a vehicle seat according to the invention with partially cut-away sections of the resilient elements.

Suspension of a vehicle seat is mounted on a floor 1 (FIG. 1) of the vehicle cabin (not shown) by means of a crosspiece 2 bearing on the floor 1 by cylindrical rests 3. Mechanical connection between the suspension of the vehicle seat and crosspiece 2 is effected through a screw pair 4 which includes a cylindrical post 5 and a lead screw 6 threadingly engageable with the cylindrical post 5. The cylindrical post 5 is secured by its lower end in the center of the crosspiece 2, the post 5 being hollow inside and having a threaded portion at the inside surface. Provided in the side wall of the cylindrical post 5 is a clamping handle 7. The proposed suspension of a vehicle seat has a bearing plate 8 to which the vehicle seat (not shown) is secured, and a first base 9 secured by the cylindrical post 5 and crosspiece 2 at the floor 1 of the vehicle cabin. Provided between the bearing plate 8 and first base 9 about the outer perimeter of the first base 9 are four resilient mechanical elements 10 in the form of springs. Lower ends of the resilient elements 10 are affixed to brackets 11 secured about the outer perimeter of the first base 9. Upper ends of the resilient elements 10 are attached to the bearing plate 8. The suspension of a vehicle seat further includes an electrodynamic exciter 12 arranged vertically in line with the axis of symmetry of the first base 9 and in parallel with the mechanical resilient elements 10, this exciter 12 being also mechanically connected to the bearing plate 8. The electrodynamic exciter 12 further includes a second base 13 (FIG. 2) fabricated from a nonmagnetic material and rigidly affixed on the first base 9 by bolts 14. Secured to the second base 13 is a magnetic circuit in the form of inner and outer cylindrical elements 15 and 16, respectively, arranged concentrically relative to each other. The outer element 15 of the magnetic circuit is secured about the outside diameter of the second base 13. The inner element 16 of the magnetic circuit is secured about the inside diameter of the second base 13 by a nut 17 threadingly engageable with the lead screw 6 which is made integral with the inner cylindrical element 16 of the magnetic circuit. The electrodynamic exciter 12 also includes two groups 18, 19 of coils 20 interconnected in series opposition. Secured at an inside surface 21 of the outer element 15 of the magnetic circuit is a group 18 of coils wound onto a frame 22 of nonmagnetic material. Wound onto an outside surface 23 of the inner element 16 of the magnetic circuit are the coils 20 of the group 19 of coils. Annular plates 24 of a nonmagnetic material are secured between the coils 20 of the group 18, 19.

The coils 20 of the groups 18 and 19 secured at the inside surface 21 of the outer element 15 of the magnetic circuit and at the inside surface 23 of the inner element 16 of the magnetic circuit are arranged in opposition to each other.

The groups 18 and 19 of coils can be interconnected both in series opposition and in series accordance.

Provided between the outer and inner elements 15 and 16 of the magnetic circuit is a magnetic unit 25 made up of successively secured annular pole pieces 26 and annular permanent magnets 27. The magnetic unit 25 is accommodated with a clearance 28 between the outside surface of the magnetic unit 25 and inside surface 21 of the outer element 15 of the magnetic circuit, and with a clearance 29 between the inside surface of the magnetic unit 25 and outside surface 23 of the inner element 16 of the magnetic circuit.

The magnetic unit 25 is positioned between the outer and inner elements 15 and 16 of the magnetic circuit by means of a guide mechanism in the form of a cup member 30 arranged at the outside surface of the outer element 15 of the magnetic circuit. Provided on the cup member 30 are bearings 31 secured at the outer element 15 of the magnetic circuit and making it possible for the cup member 30 to move vertically. The upper part of the cup member 30 has the form of a flange 32 to which a cover plate 34 is attached by bolts 33. The magnetic unit 25 is attached to the underside of the cover plate 34 by a piece 35. A rod 36 has its lower end received in a central hole of the cover plate 34, the upper end of this rod being rigidly secured to the bearing plate 8. A washer plate 37 is secured at the lower end of the rod 36 for precompressing the mechanical resilient elements 10 (FIG. 1).

Figure 2:
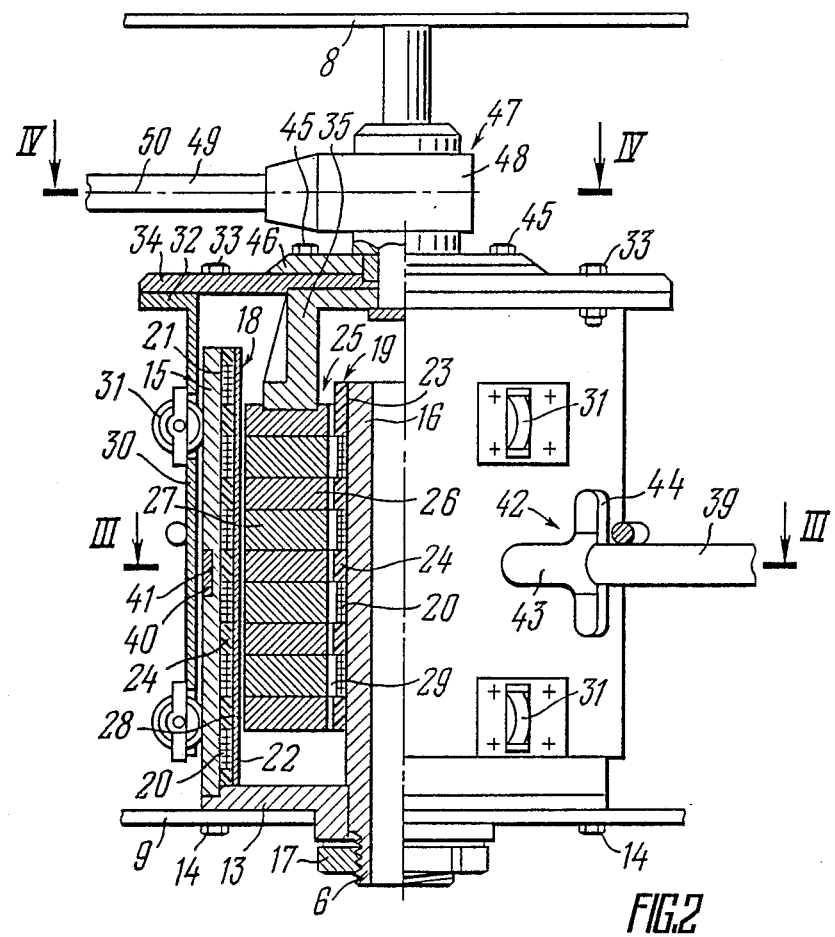
FIG. 2 is a longitudinal sectional view of an electrodynamic exciter.
Figure 3:
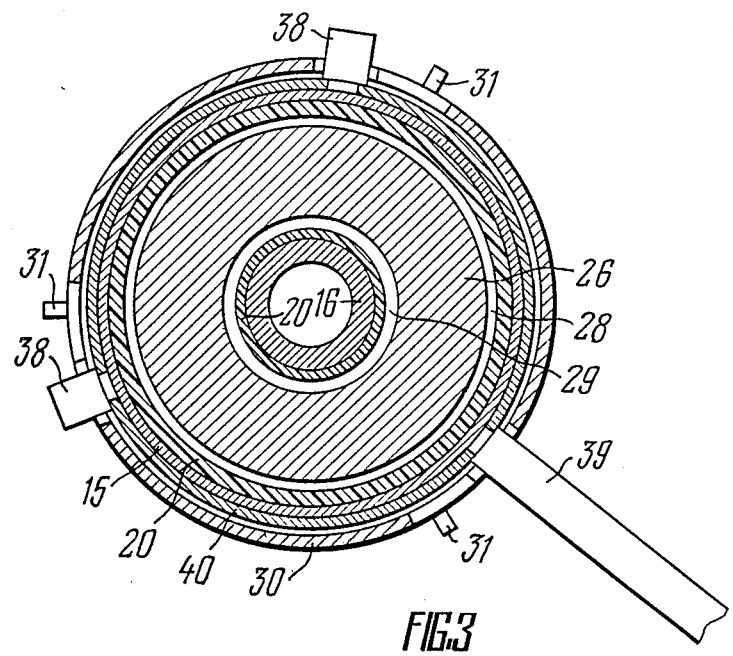
FIG. 3 is a section taken along the line III—III in FIG. 2.

Referring now to FIG. 3, provided between the outer element 15 (FIG. 2) of the magnetic circuit and cup member 30 of the guide mechanism is a first stop mechanism fashioned as three rods 38 with one such rod 38 serving as a handle 39. The rods 38 are secured on an annular plate 40 capable of rotation in an annular groove 41 (FIG. 2) provided at the outside surface of the outer element 15 of the magnetic circuit. The rods 38 (FIG. 3) are received in T-shaped holes 42 (FIG. 2) made in the cup member 30 of the guide mechanism and having horizontal and vertical recesses 43, 44.

The first stop mechanism can be alternatively embodied as a mechanical catch, and an electromagnetic mechanism arranged between the outer element 15 of the magnetic circuit and cup member 30 of the guide mechanism.

Figure 4:
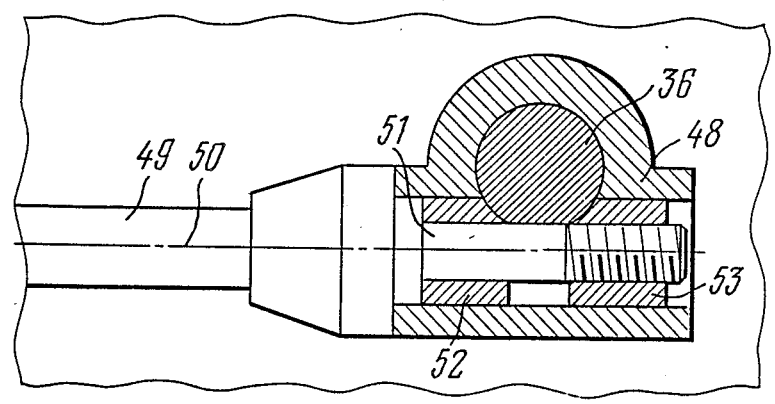
FIG. 4 is a section taken along the line IV—IV in FIG. 2.

A flange 46 is secured at the top surface of the cover plate 34 of the guide mechanism by bolts 45. Affixed to the flange 46 is a second stop mechanism 47 which includes a casing 48 (FIG. 4) the bottom part of which is secured to the flange 46 (FIG. 2). The casing 48 (FIG. 4) of the second stop mechanism 47 has a handle 49. The tail part of the handle 49 positioned in the casing 48 along the axis 50 has the form of a screw 51. The casing 48 accommodates blocks 52, 53 provided at the screw 51. The rod 36 connecting the cover plate 34 (FIG. 1) of the guide mechanism and bearing plate 8 extends through the casing 48 of the second stop mechanism 47.

The proposed suspension of a vehicle seat operates in the following manner.

In the initial position the second stop mechanism 47 (FIG. 1) is in an unclasped state. The clearance between the blocks 52 and 53 (FIG. 4) and the rod 36 allows the rod 36 to execute vertical movement. The guide mechanism with the magnetic unit 25 (FIG. 2) is not mechanically connected to the bearing plate 8, and under the action of resilient forces of the precompressed resilient elements 10 the rod 36 is brought to its extreme top position to be retained by the washer 37.

At the same time, the handle 39 with rods 38 (FIG. 3) of the first stop mechanism are received in the horizontal recesses 43 (FIG. 2) of the T-shaped holes 42 whereby the annular plate 40 disposed in the annular recess 41 of the outer element 15 of the magnetic circuit makes it possible to rigidly connect the magnetic circuit and guide mechanism to the magnetic unit 25.

In this manner the suspension of a vehicle seat is set to the initial position in which the pole pieces 26 of the magnetic unit 25 are positioned between the coils 20 of the groups 18 and 19 of coils. As the operator sits on the vehicle seat the weight of the operator compresses the resilient elements 10 for the rod 36 to freely move in the unclasped second stop mechanism 47. Therewith, thanks to the provision of the first stop mechanism between the magnetic circuit and guide mechanism with the magnetic unit 25 secured thereon, the mutual positioning of the magnetic unit 25 and coils 20 is not changed. After bringing the suspension to the state of static equilibrium with the force of resilience of the compressed resilient elements 10 (FIG. 1) is counterbalanced by the gravity force exerted by the weight of the operator, the operator turns the handle 49 to clasp the second stop mechanism 47. Thanks to the threaded connection, turning of the handle 49 causes the block 53 (FIG. 4) to move along the axis 50 of the screw 51 of the handle 49 reducing the clearance between the blocks 52, 53 and rod 36. As a result, the second stop mechanism 47 is brought to compressed state, when the rod 36 is rigidly affixed by the blocks 52, 53 relative to the casing 48 ensuring a rigid mechanical connection between the guide mechanism of the electrodynamic exciter 12 (FIG. 2) and bearing plate 8. Then, the handle 39 is brought out of engagement with the cup 30 of the guide mechanism by moving the rods 38 from the horizontal recesses 43 of the T-shaped holes 42 to the vertical recesses 44.

Thanks to that the suspension is brought to the state of static equilibrium, elimination of the rigid mechanical connection in the vertical direction between the magnetic circuit and guide mechanism of the electrodynamic exciter 12 fails to change the initial position of the electrodynamic exciter 12. Bringing the handle 39 to the vertical recesses 44 of the T-shaped holes 42 makes it possible to move the guide mechanism with the magnetic unit 25 in the vertical direction relative to the magnetic circuit of the electrodynamic exciter 12. The size of the vertical recess 44 of the T-shaped hole 42 must be not less than two times the highest amplitude of oscillations of the electrodynamic exciter 12 in the course of movement of the vehicle. Otherwise, collisions between the rod 38 and cup 30 of the guide mechanism may take place to affect protection against vibrations.

During movement of the vehicle a source of direct current (not shown) connected to the groups 18, 19 of coils 20 is energized. The flow of direct current through the coils 20 is preferably such as to ensure that interaction of the direct current passing through the coils 20 and magnetic field in the clearances 28, 29 between the magnetic unit 25 an outer and inner elements 15, 16 of the magnetic circuit a pushing force is generated having a direction opposite to the action of the outer forces causing oscillations of the bearing plate 8. The pushing force acts on the magnetic unit 25 and results in reduced mechanical oscillations of the magnetic unit 25 and consequently of the bearing plate 8 to which the vehicle seat is secured. The action of the pushing force on the magnetic unit 25 results in a reduction in the dynamic rigidity of the mechanical resilient elements 10 (FIG. 1).

Adjustment of the vehicle seat for a different operator driving the vehicle is done in the following manner. The handle 39 (FIG. 2) is placed in the horizontal recess 43 of the T-shaped hole 42, and by unclasping the second stop mechanism 47 the suspension is made to assume the initial position ensuring the correct initial position of the electrodynamic exciter 12. This is followed by the heretofore described procedures for setting the suspension in a static equilibrium. Balancing out of the weight force of the operator is done by virtue of the static rigidity of the suspension preselected so as to ensure the allowable static sagging. At the same time, thanks to the action of the electrodynamic exciter 12, the dynamic rigidity of the suspension influencing the protection against vibration can be substantially reduced because of the action of the electrodynamic exciter 12. Reduced dynamic rigidity of the suspension leads to a reduction in the frequency of natural oscillations of the suspension and more effective protection against vibrations.

The proposed suspension of a vehicle seat makes it possible to obviate the harmful effect of low-frequency vibrations on the driver of the vehicle. The accompanying advantage is reduced fatigue of the operator, and consequently higher working efficiency and lower likelihood of emergency situations.

What is claimed is:

1. A suspension of a vehicle seat comprising a bearing plate to which the vehicle seat is secured;
   a first base having an outer perimeter and mounted on the floor of the vehicle cabin;
   mechanical resilient elements secured about the outer perimeter of said first base between said bearing plate and first base;
   an electrodynamic exciter arranged vertically in line with the axis of symmetry of said first base and parallel with said mechanical resilient elements; a second base of said electrodynamic exciter having inside and outside diameters, fabricated from a nonmagnetic material, and secured on said first base; a magnetic circuit of said electrodynamic exciter having outer and inner cylindrical elements arranged concentrically relative to each other; said outer cylindrical element of said magnetic circuit having outside and inside surfaces and being secured about the outside diameter of said second base; said inner cylindrical element of said magnetic circuit having outside and inside surfaces and being secured about the inside diameter of said second base; two groups of coils of said electrodynamic exciter electrically connected in series opposition; said coils of the first group being secured at the inside surface of said outer cylindrical element of said magnetic circuit; said coils of the second group being secured at the outside surface of said inner cylindrical magnetic circuit; a guide mechanism of said electrodynamic exciter having the form of a cup; the cup of said guide mechanism having upper and lower ends and a cylindrical wall, and being mounted at the outside surface of said outer cylindrical element of said magnetic circuit to be capable of vertical movement; bearings provided at the cylindrical wall of said cup of the guide mechanism to facilitate the vertical movement; a cover plate of said guide mechanism secured at the upper end of said cup and having a central hole; a rod of said guide mechanism having first and second ends, and received by the first end in said central hole of said cover plate of the guide mechanism for free movement therein, and having its second end secured to said bearing plate; a magnetic unit of said electrodynamic exciter having outside and inside surfaces, made up of successively secured annular pole pieces and annular permanent magnets, attached on said cover plate of the cup of said guide mechanism, accommodated between said outer and inner cylindrical elements of said magnetic circuit with a clearance between the outside surface of said magnetic unit and inside surface of said outer cylindrical element of said magnetic circuit and with a clearance between the inside surface of said magnetic unit and outside surface of said inner cylindrical element of said magnetic circuit; a first stop mechanism of said electrodynamic exciter provided between said outer cylindrical element of said magnetic circuit and said cup of said guide mechanism; a second stop mechanism of said electrodynamic exciter secured on said cover plate of said guide mechanism.

2. A suspension of a vehicle seat as defined in claim 1 comprising
   said cup of said guide mechanism with at least one hole made in the cylindrical wall of said cup of the guide mechanism having a T-shaped configuration;
   said outer element of said magnetic circuit, an annular groove made at the outside surface of said outer element of said magnetic circuit; an annular plate received in said groove;
   said first stop mechanism, at least one rod of said first stop mechanism received in said holes of said cup of said guide mechanism and rigidly secured on said annular plate, one rod of said first stop mechanism serving as a handle.

* * * * *